(12) United States Patent
Erben et al.

(10) Patent No.: US 7,227,324 B2
(45) Date of Patent: Jun. 5, 2007

(54) PARKING BRAKE AND METHOD FOR CONTROLLING THE SAME

(75) Inventors: Ralf Erben, Kemmenau (DE); Ralf Kinder, Eitelborn (DE); Ralf Leiter, Vallendar (DE); Gregor Poertzgen, Koblenz (DE)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 11/471,077

(22) Filed: Jun. 20, 2006

(65) Prior Publication Data

US 2006/0261764 A1     Nov. 23, 2006

Related U.S. Application Data

(63) Continuation of application No. PCT/EP2004/013864, filed on Dec. 6, 2004.

(30) Foreign Application Priority Data

Dec. 23, 2003   (DE)   ................  103 61 042

(51) Int. Cl.
*H02P 1/04*   (2006.01)
(52) U.S. Cl. .................... 318/430; 318/432; 318/433; 318/434; 318/362
(58) Field of Classification Search ............. 188/158, 188/162; 701/70; 477/71; 318/430, 432, 318/433, 434, 362
See application file for complete search history.

(56) References Cited

U.S. PATENT DOCUMENTS

| 4,804,073 | A | 2/1989 | Taig et al. |
|---|---|---|---|
| 5,139,315 | A | 8/1992 | Walenty et al. |
| 5,220,259 | A | 6/1993 | Werner et al. |
| 5,417,624 | A | 5/1995 | Weissbrich et al. |
| 5,769,189 | A | 6/1998 | Heibel et al. |
| 6,173,820 | B1 * | 1/2001 | Blosch et al. ............... 188/158 |
| 6,224,017 | B1 * | 5/2001 | Fischer et al. ............. 244/99.9 |
| 6,230,854 | B1 | 5/2001 | Schwarz et al. |
| 6,249,737 | B1 | 6/2001 | Zipp |
| 6,435,625 | B1 | 8/2002 | Schwarz et al. |

FOREIGN PATENT DOCUMENTS

| DE | 42 33 243 A1 | 4/1993 |
|---|---|---|
| DE | 196 52 230 A1 | 6/1998 |
| DE | 197 03 838 A1 | 8/1998 |
| DE | 197 42 920 A1 | 4/1999 |
| DE | 102 12 612 A1 | 10/2003 |
| EP | 0 729 871 A1 | 9/1996 |
| EP | 1 498 633 A1 | 1/2005 |

* cited by examiner

*Primary Examiner*—Karen Masih
(74) *Attorney, Agent, or Firm*—MacMillan, Sobanski & Todd, LLC (57) ABSTRACT

A method for controlling an electrically actuable parking brake is described. In this method the cutoff current of the electric motor is varied to compensate for example for changes in the application force associated with aging or wear or for changes in the application force due to changes in the resistance and/or temperature of an electric motor.

16 Claims, 8 Drawing Sheets

PARKING BRAKE AND METHOD FOR CONTROLLING THE SAME

CROSS-REFERENCE TO RELATED APPLICATIONS

This application is a continuation of International Application No. PCT/EP2004/013864 filed Dec. 6, 2004, the disclosures of which are incorporated herein by reference, and which claimed priority to German Patent Application No. 103 61 042.1 filed Dec. 23, 2003, the disclosures of which are incorporated herein by reference.

BACKGROUND OF THE INVENTION

The invention relates to a parking brake. The invention relates in particular to an electrically actuable parking brake.

A parking brake is known from EP 0 729 871 A1, and corresponding U.S. Pat. No. 5,769,189 A1, in which a friction lining can be pressed against a brake disc by means of a brake piston. For this purpose pressurised hydraulic fluid is conventionally introduced into a hydraulic chamber in the case of service braking operations, of which chamber one limiting wall is formed by the brake piston. The pressure in the hydraulic chamber leads to displacement of the brake piston, and thus of the friction lining, in the direction of the brake disc. This known vehicle brake can be used as a parking brake, in addition to being used as a service brake. For this purpose it comprises an electrically actuable spindle/nut arrangement for mechanically securing the brake piston in a state in which the friction lining is engaged with the brake disc.

Brake arrangements are also known in which, instead of hydraulic actuation, an electrical drive brings about the displacement of the brake piston, and thus of the friction lining, in the direction of the brake disc and away from it (also) in the case of service braking operations. The electromechanical brake in DE 102 12 612 A1 for example dispenses completely with hydraulic transmission of the actuating force. A pedal force applied by the driver is detected and transmitted as an electrical signal to a controller. After evaluating various further sensor signals (for example operating parameters of the brake), the controller meters the braking force.

The current consumption of the electric motor is used as one of the measured quantities for adjustment of the application force in electrically actuable parking brakes. The size of the current consumption of the electric motor is designated as the cutoff current, at which size a desired application force is attained in the callipers. The electric motor is cut when this current is reached. A self-locking gearing or other means mean that the attained application force is maintained despite cutting of the electric motor.

BRIEF SUMMARY OF THE INVENTION

The object of the invention is to control an electrical parking brake in such a way that increased operating reliability and convenient operation are ensured.

This object is achieved using a method for controlling a parking brake having a brake actuator that acts on one or more brake shoe(s) and comprises an electric motor, in which a cutoff current of the electric motor is varied to compensate for changes in the application force. If the control method of the parking brake comprises a control algorithm the respective desired cutoff current to be adjusted can be varied.

System parameters of the electric motor and/or of the brake system and/or external influential factors are preferably detected for monitoring mechanical and electronic components. Compensation of changes in the application force takes place on this basis. The cutoff current for compensation of a loss in efficiency when the clamping power is generated is expediently increased gradually. A gradual increase in the cutoff current, for example after a predetermined event number, may thus take place. In a further embodiment the cutoff current can be continuously increased.

To compensate for a loss in efficiency in the mechanical components of a brake actuator, for example as a consequence of material fatigue and wear, in one embodiment of the invention the size of the cutoff current of the electric motor is adjusted to achieve a predetermined application force. The loss in efficiency can be corrected by including in the count the actuation cycles of the brake for example (or other events, such as stopping or locking of the vehicle) and by adjustment of the cutoff current that is based thereon. For this purpose attainment of a predetermined event number can be monitored using an event counter and on attainment of this number a measure for adjustment of the cutoff current consumption can be initiated.

A change in the resistance of the electric motor may also be taken into account when adjusting the cutoff current in order to achieve the desired application force.

In one embodiment of the invention the temperature of the electric motor is taken into account in the cutoff current adjustment, and this allows conclusions to be drawn about a change in the resistance of the electric motor. The cutoff current can then be varied according to the change in temperature or resistance. One possible method of drawing conclusions about the temperature of the electric motor is to determine the brake disc temperature which allows conclusions to be drawn about the change in the resistance of the electric motor as well. A further possibility of determining the temperature of the electric motor is to determine the number of brake actuations within a specific time interval. Inferences about the inherent heating of the motor, which in turn has an effect on the electrical resistance of the electric motor, may be made therefrom and may thus be taken into account when determining the cutoff current.

In a further embodiment it is provided that the change in the temperature of the electric motor is determined by evaluating an idling speed and/or operating voltage. As the operating voltage is generally approximately constant an increase in temperature, and thus a reducing resistance of the electric motor, may be indicated with reference to an increased idling speed, and this can in turn lead to a cutoff current adjustment. In a further advantageous embodiment the invention also takes into account variations in the voltage of the on-board electrical system of a vehicle when changing the cutoff current.

A change in the idling current of the electric motor may also be taken into account when adjusting the cutoff current. To compensate for changes in the application force, which can, for example, be attributed to a temperature-related change in idling current, it would be conceivable to divide the cutoff current into an idling current component and a current consumption component that is used for the actual generation of the application force. The application force may be adjusted on the basis of the current consumption component while the idling current component is ignored.

The electronic control unit of the invention allows separate or joint activation of the brake actuators of different vehicle wheels. In this case the control unit advantageously processes received sensor signals, optionally links these with data from other sensors and control systems and calculates for every wheel actuator, separately or for all wheel actuators together, the required cutoff current to achieve a predetermined application force.

Deviations from the nominal idling current of the electric motor may be recognized by evaluating variables, such as the outside or windscreen temperature, the braking pressure and by means of a right-left comparison of the actuators. Deviations of this type can be taken into account when adjusting the cutoff current. Detection of deviations of this type also allows conclusions to be drawn about faults in the mechanical components of the system. In a preferred embodiment of the invention faults of this type are indicated to the driver or a diagnostic system, and this allows replacement of the defective parts in good time for example. The driving comfort and the driving and traffic safety are also improved hereby.

The invention also relates to an electronic unit for controlling a brake actuator, which acts on one or more brake shoe(s) and comprises an electric motor, of a parking brake. The electronic control unit is constructed for example to compensate for changes in the application force associated with aging or wear or for changes in the application force due to changes in the resistance and/or temperature of the electric motor for example due to variation of the cutoff current of the electric motor. Evaluation of the signal from a force sensor is preferably refrained from when adjusting the application force. In other words, the parking brake does not need a force sensor.

The information required in the control unit for the control unit is tapped via sensors. Thus for example the temperature, time, electrical variables and/or event numbers may be determined by means of sensors and subsequently be supplied via a bus system to the electronic control unit.

It is advantageous if a plurality of memory sectors is provided in the electronic control unit for storing the sensor values. A distinction can be made here between a memory sector for current values and a memory sector for predefined values. The memory sector for predefined values expediently contains reference values which are used for comparison with and/or calculation of current values.

Other advantages of this invention will become apparent to those skilled in the art from the following detailed description of the preferred embodiment, when read in light of the accompanying drawings.

DETAILED DESCRIPTION OF THE INVENTION

Figure 1:
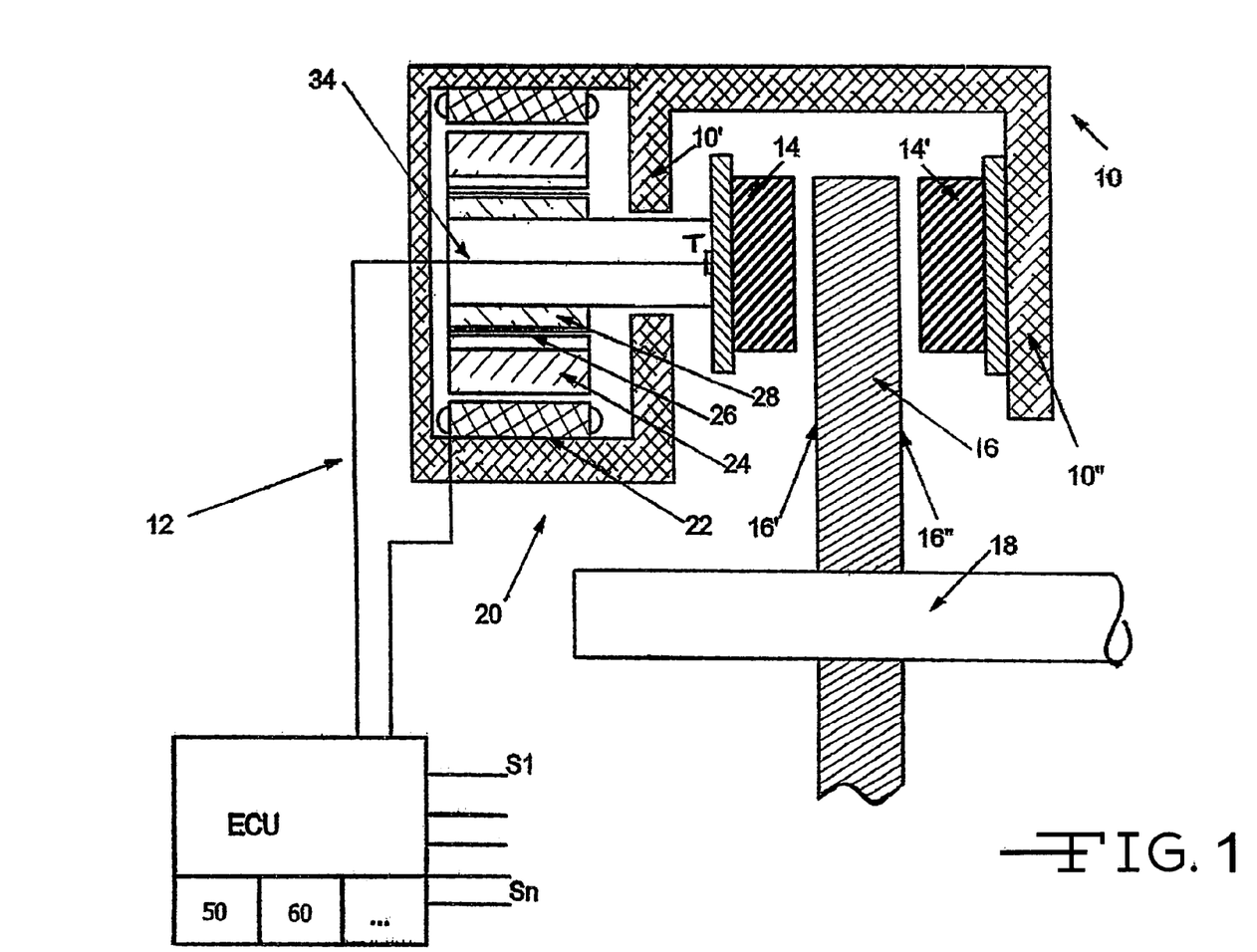
FIG. 1 shows a schematic longitudinal section of an electrically actuable parking brake according to the invention in the form of a disc brake.

FIG. 1 shows an electrically actuable vehicle brake 1 which in longitudinal section has a substantially U-shaped calliper 10 and an electrical actuating unit, an actuator 12, arranged on the calliper 10. Two friction linings 14, 14' (received in guides that are not shown) are arranged in the calliper 10 on the two legs 10', 10" thereof. The two friction linings 14, 14' are arranged on either side of a brake disc 16 that is overlapped by the calliper 10 and in each case interact with a lateral face 16', 16" of the brake disc 16. The brake disc 16 is non-rotatably connected to an axle neck 18 (only partially shown) of the motor vehicle. The friction linings 14, 14' are arranged in the calliper 10 so as to be displaceable toward the brake disc 16 and away from it. The illustrated embodiment involves what is known as a floating calliper arrangement in which one of the friction linings 14 can be brought directly into frictional engagement with the brake disc 16 by the actuator 12 and the other friction lining 14' can be brought into frictional engagement with the brake disc 16 by the effect of a reaction force applied by the calliper 10.

The actuator 12 is placed on the side of the calliper 10 and comprises an electric motor 20 which interacts with a brake piston 34. The brake piston 34 projects through the electric motor 20 up to the friction lining 14. In the illustrated embodiment the electric motor 20 is an internal rotor motor comprising a stator 22, which is securely arranged on the housing, and a rotating rotor 24. An internal gear 26, which can transmit a rotation of the rotor 24 to a ring 28 with an external gear, the ring being non-rotatably but axially displaceably arranged on the brake piston 34, is arranged in the interior of the rotor 24. This gearing 26, 28, which operates in the manner of a nut/spindle arrangement, has a relatively high gear reduction. The gearing 26, 28 is used to convert the rotational movement of the electric motor 20 into a longitudinal movement of the brake piston 34 to actuate the friction linings 14, 14'.

The vehicle brake 1 illustrated in FIG. 1 may be used in a service braking mode and as a parking brake. The use of the vehicle brake 1 as a parking brake will be considered in more detail hereinafter.

Use is made of the parking functionality of the vehicle brake 1 in particular when parking the vehicle or driving on an inclined road surface. In this case the electric motor 20 is activated by the electrical control unit ECU to bring the friction linings 14, 14' into abutment with the brake disc 16 in order to generate an application force. The current consumption of the electric motor 20 increases as the application force increases. It is conventionally, and in particular in the case of vehicle brakes without force sensors, assumed that a predetermined application force is attained (and the electric motor 20 can thus be cut) if the current consumption of the electric motor 20 has reached a predetermined value, the cutoff current J. On attaining the cutoff current J the electronic control unit ECU stops the flow of current to the electric motor 20 and thus cuts it. The application force generated is maintained owing to the self-locking properties of the gearing 26, 28. To reduce the application force it is therefore necessary to operate the electric motor 20 in a direction of rotation opposite to the application direction of rotation.

According to FIG. 1 the electric motor 20 is connected by appropriate wires to the electronic control unit ECU to generate the activation signals for the electric motor 20. As the electronic control unit (ECU) regulates the cutoff current J for the electric motor 20 the electronic control unit ECU can also influence the functional connection between the application force to be adjusted and the current consumption of the electric motor 20.

Representative signals are also sent to the electronic control unit ECU from sensors S1 . . . , Sn, present in or on the motor vehicle, for operating states of the motor vehicle. The detected operating states include for example the actuation number of the parking brake, the temperature of the brake disc 16, the temperature of the electric motor 20, the idling speed of the electric motor 20, and, if desired, external influential factors.

The electronic control unit ECU comprises one or more first memory locations 50 in which current measured values are stored that are determined by the sensors S1, . . . , Sn, and one or more second memory locations 60 to store predefined comparative values/reference values therein. The comparative values can be functional correlations of predetermined variables which include measured values of the sensors. They can be stored in the form of characteristics, tables, predetermined values or functions which connect measured values from the sensors S1, . . . , Sn and cutoff current values. It is conceivable for tolerance ranges for the above-mentioned values to also be stored in the memory sector of the electronic control unit ECU.

In one embodiment of the present invention the electronic control unit ECU accesses a characteristic or table stored in the comparative value memory 60 of the electronic control unit ECU to compensate for a change in the application force, and for a current input value (for example the actuation number) determines a correction size of the cutoff current J to compensate for changes in the application force.

Figure 2:
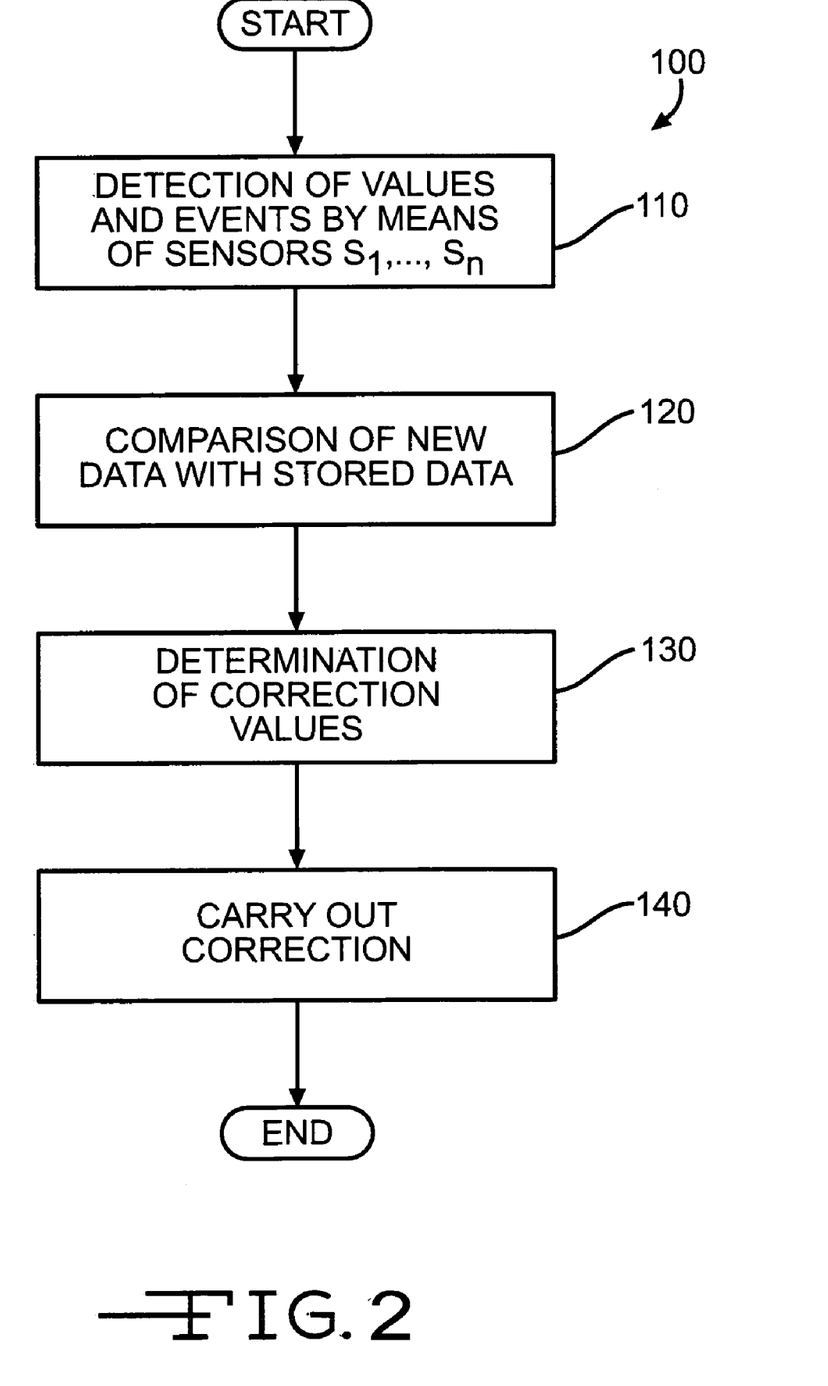
FIG. 2 illustrates in a simplified flow diagram the fundamental steps for carrying out a correction method according to the present invention.

FIG. 2 broadly illustrates the method steps which are to be carried out to determine the correction values according to the present invention. It is assumed that predetermined values, functions or characteristics are already stored in the memory for comparative values 60 of the electronic control unit ECU. It may be necessary for comparative values in the memory 60 to be updated or modified. For example the original desired cutoff current J can be continuously replaced by the size of the cutoff current J modified by a correction value.

The first step for initiating the method step generally designated by 100 is detecting values 110 (for example measured values or events) by means of the sensors S1, . . . , Sn. The detected values are stored 110 in the memory for current values 50 of the electronic control unit ECU. The detected values are compared in step 120 with the comparative values from the memory 60 of the electronic control unit ECU and/or used as the input values for determining correction values in step 130 by means, for example, of the stored functions or characteristics. The subsequent step 140 consists of correction of the cutoff current J.

Figure 3:
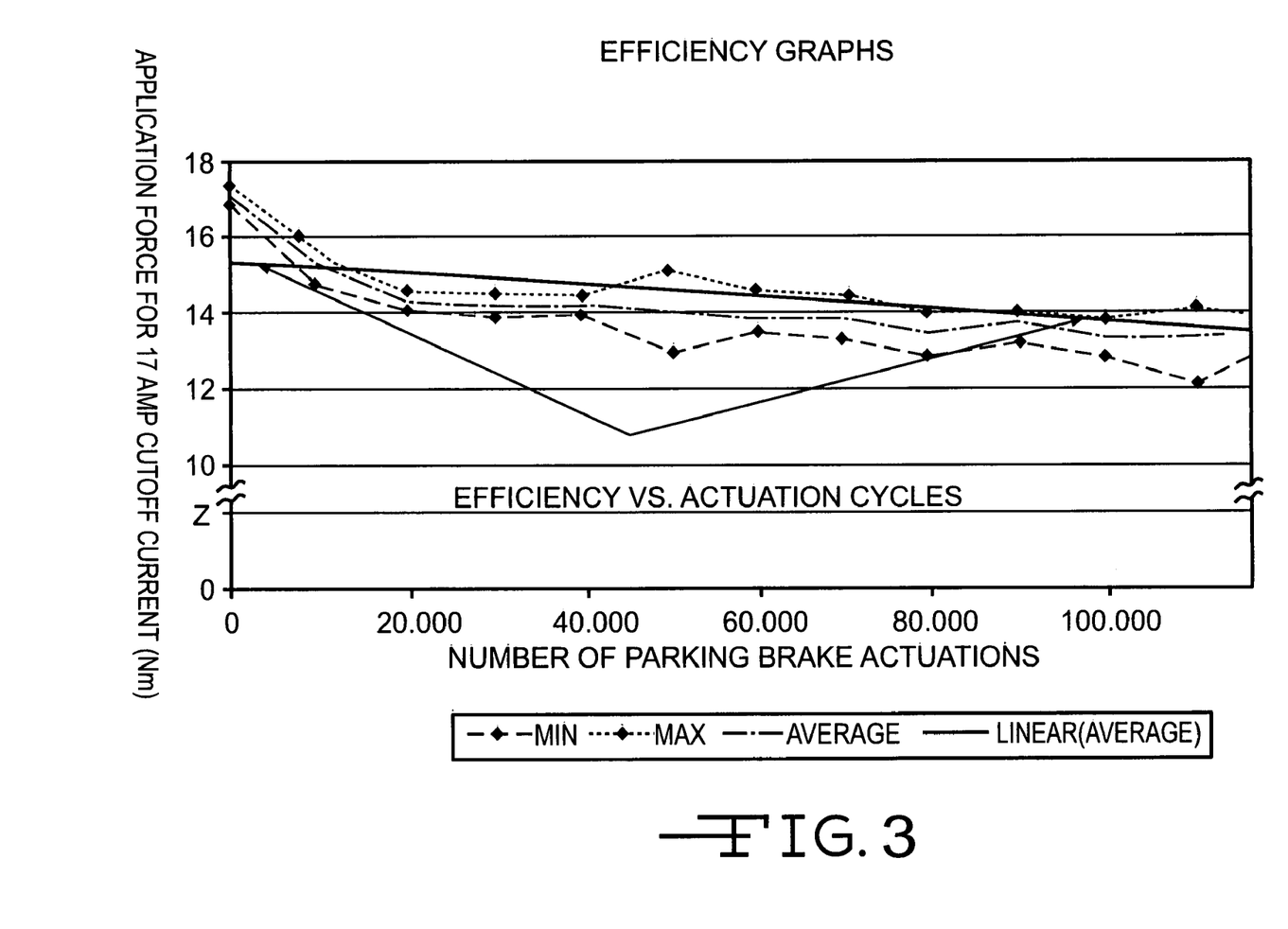
FIG. 3 shows efficiency characteristics which illustrate the dependence of the application moment on the actuation number of a parking brake actuator.

FIG. 3 shows a graph illustrating the characteristic of a loss in efficiency of the actuator 12 as a function of the number of actuations of the parking brake. It has been found in practice that the efficiency of the actuator 12 decreases roughly linearly with the number of actuation cycles owing to the material fatigue of the mechanical components that is associated therewith. As shown in the graph, after 80,000 actuations the application force drops from 17 kN to 14 kN at the constant cutoff current (17 A).

Figure 4:
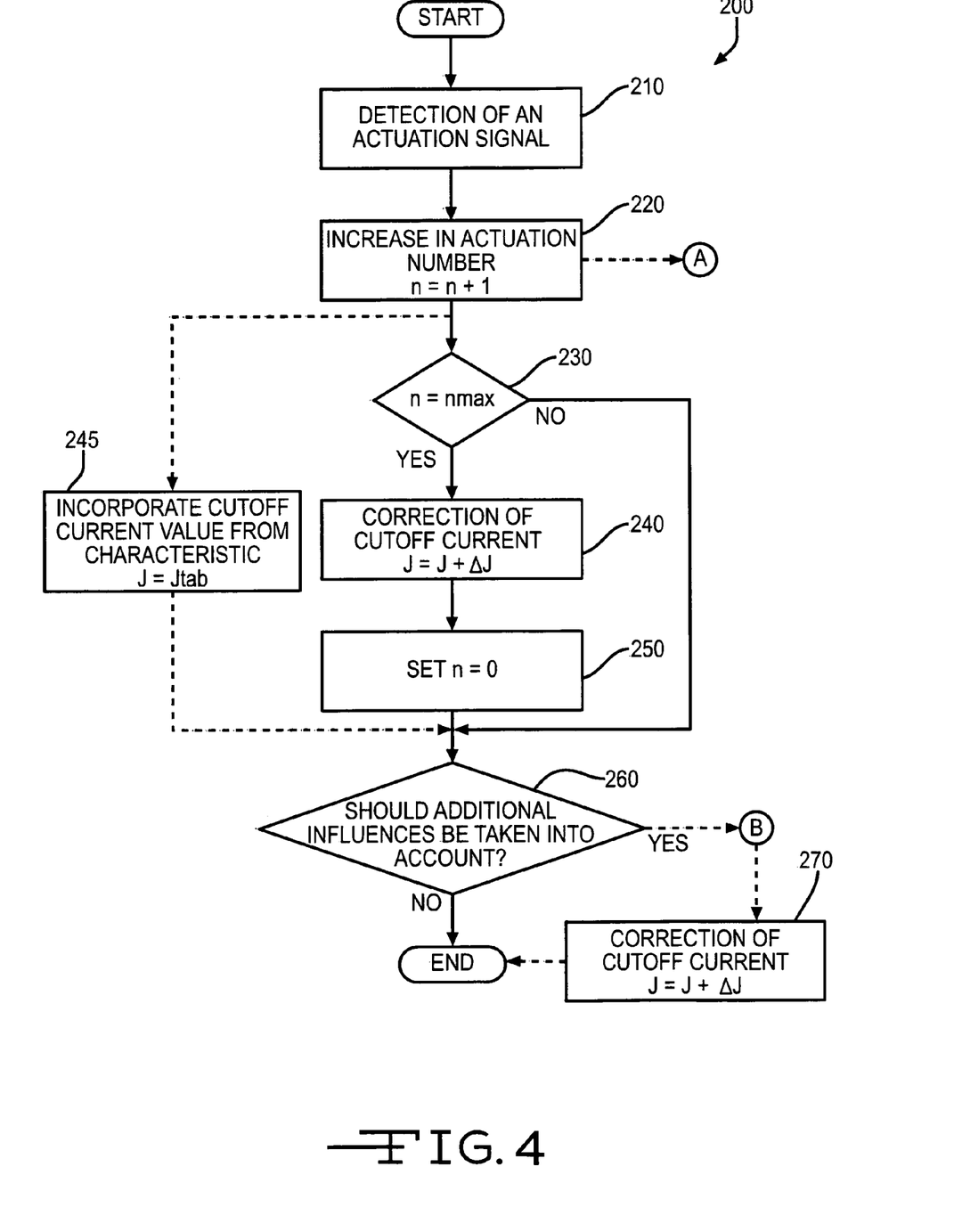
FIG. 4 illustrates in a flow diagram exemplary method steps of a further embodiment according to the present invention in which the effects as a consequence of mechanical wear and material fatigue are taken into account.

FIG. 4 shows a flow diagram 200 which illustrates a cutoff current adjustment according to an embodiment of the invention in which the effects owing to mechanical wear and material fatigue are taken into account. For this purpose actuation of the parking brake is detected in a first step 210 by means of sensors S1, . . . , Sn. An actuation counter of the electronic control unit ECU is subsequently incremented in a second step 220. An actuation number n is thus retrieved from the memory 50 for current values of the electronic control unit ECU, increased by 1 and rewritten as a new current value n=n+1 in the memory 50 of the electronic control unit ECU.

During a subsequent inquiry 230 the incremented value of the actuation number n is compared with a preset value nmax from the memory 60 of the electronic control unit. If the incremented value n is smaller than the preset value nmax, the cutoff current J is not corrected.

However, as soon as the actuation number n attains the value nmax, the cutoff current J of the electric motor 20 of the actuator 12 is adjusted in a further step 240. For example, a specific cutoff current value J is increased after nmax=1,000 actuations by a compensating variable $\Delta J$ which is stored in the memory 60 for predetermined values. The actuation number n is subsequently re-set to zero in a further step 250.

The embodiment of the invention described with reference to FIG. 4 is based on a gradual increase in the cutoff current J, after a constant actuation number nmax, by $\Delta J$. This type of compensation correction is particularly suitable for linear functional correlations.

Non-linearly extending characteristics in particular can be taken into account in a further embodiment of the invention in that after a predetermined actuation number nmax, the new size of the cutoff current J=Jtab of a characteristic or table stored in the memory 60 is extracted 245. This is shown in FIG. 4 by means of broken lines and by means of step 245. In this case determination of the cutoff current J is omitted after step 240. In the alternative embodiment step 250 may also be omitted as the size of the cutoff current Jtab can be extracted directly as a function of the current actuation number n from a predefined characteristic or table in the memory 60.

As a further supplementary alternative for more precise determination according to the invention of the cutoff current J, the flow diagram has been supplemented by the possibility of a fine regulation 260, 270—also only indicated by a broken line in the flow diagram 200. In this case the size of the cutoff current J determined in step 240 or 245 can be corrected by a correction value $\Delta J$ that takes into account further influences. For example the parameters, such as temperature and resistance of the electric motor 20, detected by the sensors of the parking brake S1, . . . , Sn, can be taken into account when adjusting the cutoff current.

Figure 5:
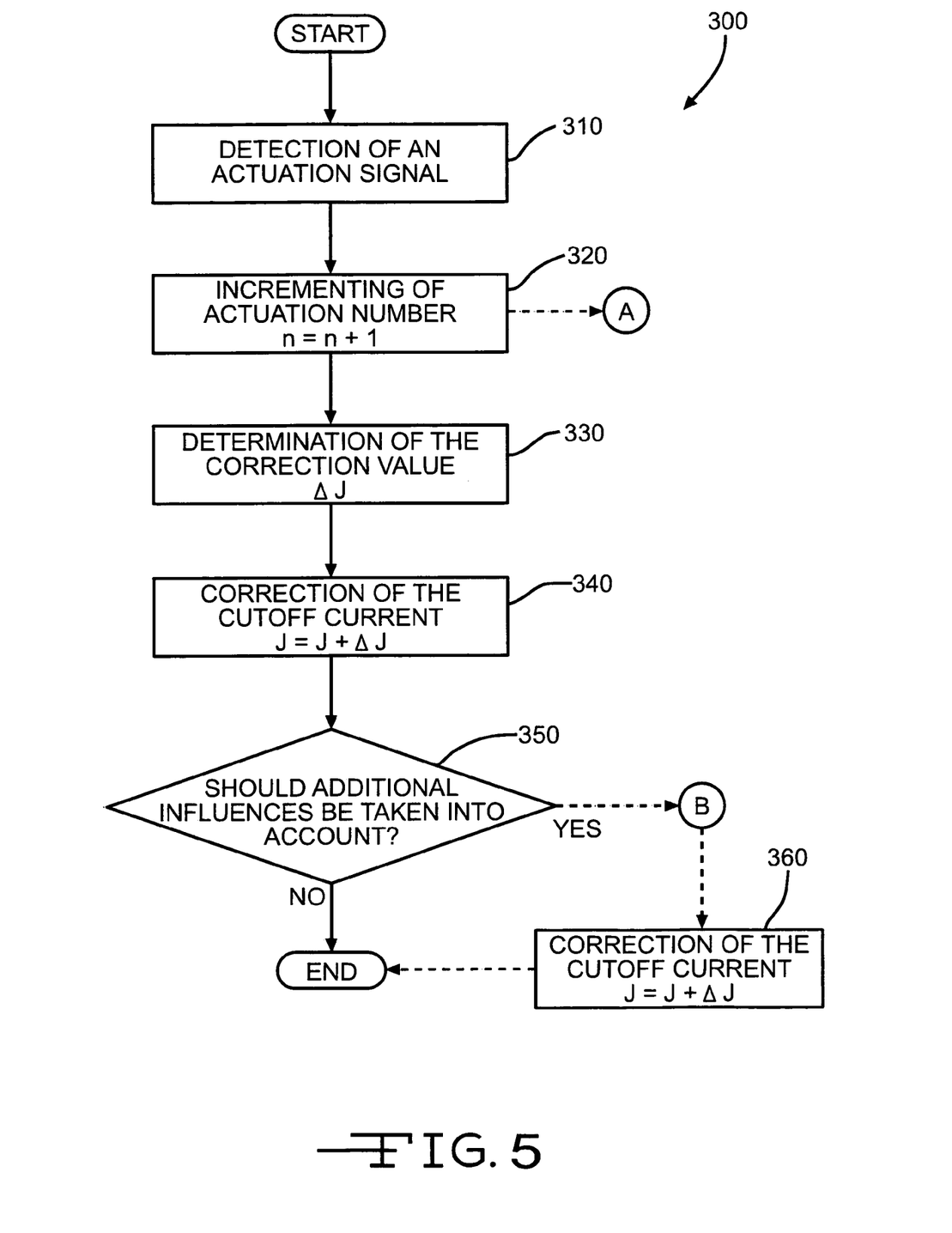
FIG. 5 illustrates in a flow diagram exemplary method steps of a further embodiment according to the present invention in which the effects as a consequence of mechanical wear and material fatigue are also taken into account.

FIG. 5 shows in a flow diagram 300 a further embodiment of the method according to the invention. In this embodiment the actuation number n is not reset to zero as in step 250 of FIG. 4, rather is constantly incremented 320 following detection of the actuation signal 310. In accordance therewith a correcting cutoff current $\Delta J$ can be calculated/determined in step 330 with the aid of a function or table stored in the memory 60 of the electronic control unit ECU. The cutoff current J is adjusted in the next step 340.

In addition to the disclosed possibilities further adjustments may be made in steps 350, 360 for more precise correction of the cutoff current J.

Figure 6:
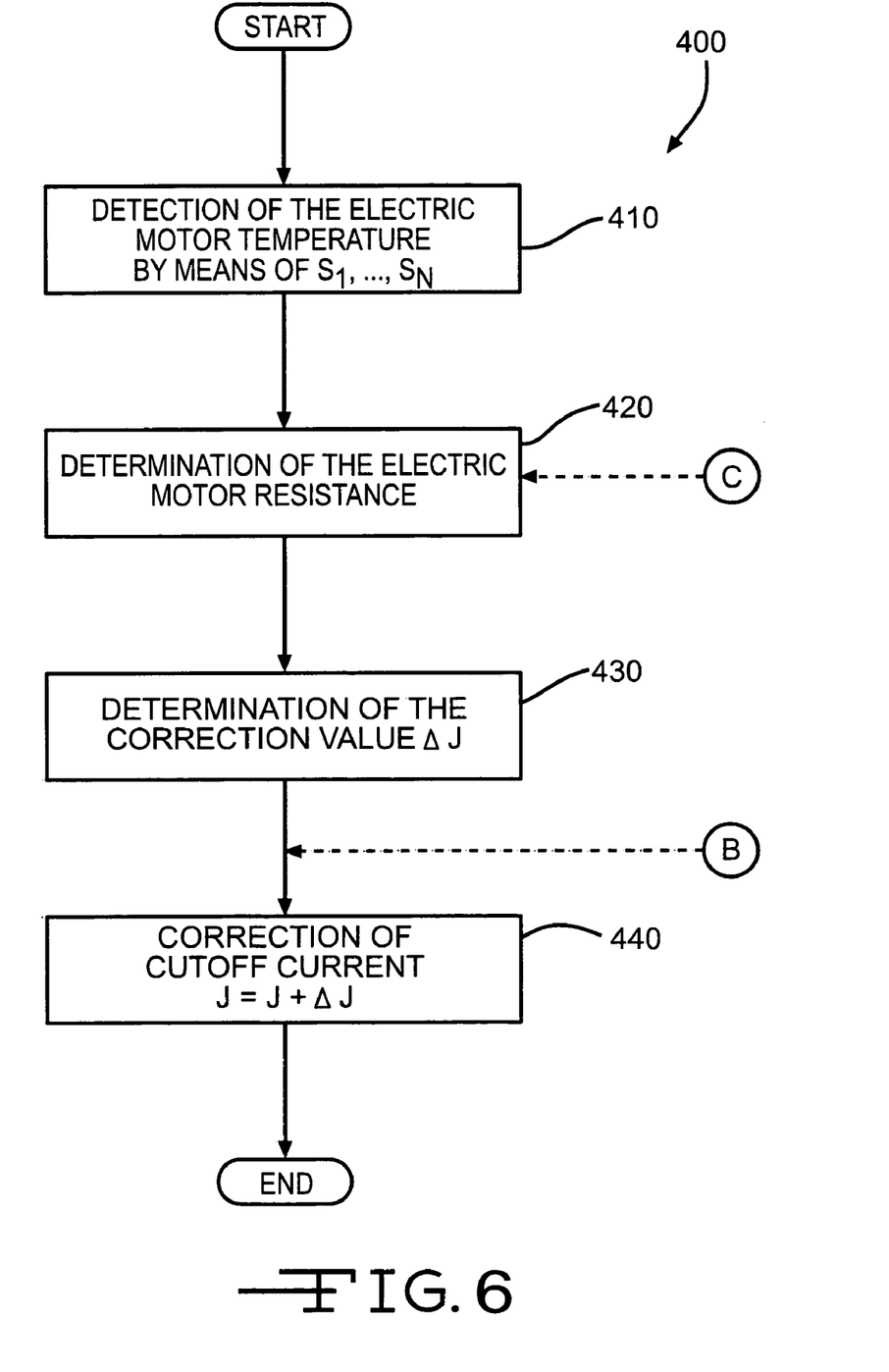
FIG. 6 illustrates in a flow diagram exemplary method steps of a further embodiment according to the present invention for determining a cutoff current as a function of a resistance or temperature of an electric motor.

FIG. 6 shows by way of example a flow diagram 400 in which the steps according to the invention for determining a corrected cutoff current J or a correcting fraction ΔJ, as a function of the resistance of the electric motor 20 or the temperature thereof, are illustrated. In this case the temperature T of the electric motor 20 is detected in a first step 410. This can take place by means of a sensor S1, . . . , Sn which passes the temperature of the electric motor 20 to the electronic control unit ECU.

The resistance, which is being established, of the electric motor 20 can be indicated in a further step 420 via detected temperature information and with the aid of the reference values stored in the memory 60 of the electronic control unit ECU. To compensate the cutoff current J a correction value ΔJ is then determined in step 430, on the basis of the resistance of the electric motor 20, in such a way that a predetermined application force is attained. The cutoff current value J can then be corrected in the subsequent step 440 by the value ΔJ determined in step 430.

The determined correction value ΔJ may be taken into account separately or in addition to further correction values ΔJ of the cutoff current J. This is shown in FIG. 6 by means of the intersecting point B and the broken line. For the purpose of better understanding FIG. 6 should be viewed in conjunction with FIGS. 4 and 5 as well.

In a further embodiment the temperature of the electric motor 20 may also be a variable derived within the electronic control unit ECU (cf. also FIGS. 7 and 8), which variable corresponds to the temperature of the electric motor 20 and can be supplied to step 240 for further processing via an intersecting point C—shown here by means of a broken line.

Figure 7:
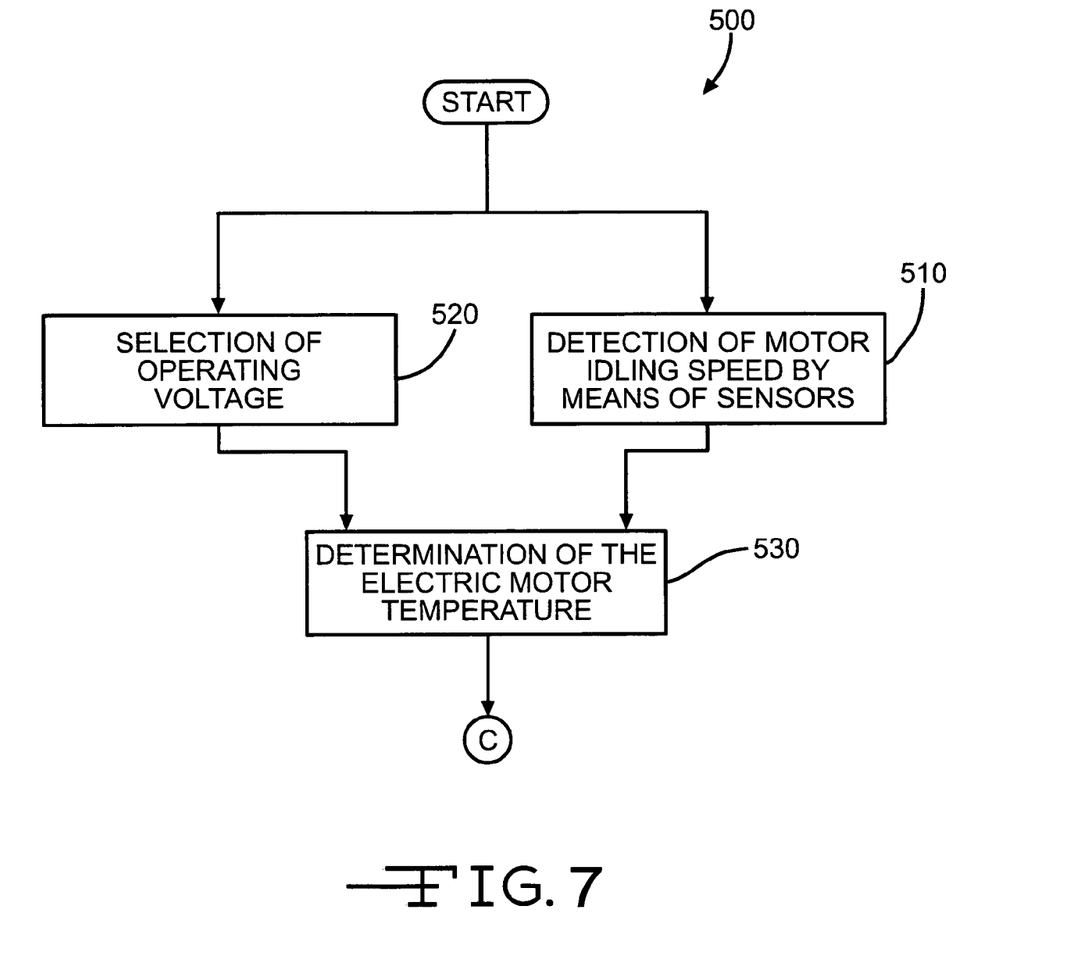
FIGS. 7 and 8 illustrate in respective flow diagrams exemplary method steps of a further embodiment of the method according to the invention for determining the temperature of an electric motor.

The flow diagram 500 in FIG. 7 shows how in a further embodiment of the invention the temperature of the electric motor 20 is determined from an operating voltage stored in the memory 60 of the electronic control unit ECU, or a measured operating voltage, and an idling speed determined by means of a sensor S1, . . . , Sn.

For example, 11,790 rpm was measured at a motor temperature of 20° C. and 13,680 rpm at 100° C. If the operating voltage is regarded as being constant, a correlation with the temperature increase of the motor may be produced with reference to the increased idling speed, which increase in turn allows a change in the resistance of the electric motor 20 to be inferred and as a further consequence allows a correction value ΔJ to be determined in step 430 in FIG. 5. The idling speed is detected in step 510 by means of a sensor S1, . . . , Sn and together with the operating voltage value read from the memory 60, or the measured operating voltage, step 520, is forwarded to step 530. The two values for determining the temperature of the electric motor 20 are processed in step 530. The temperature information is then supplied via an intersecting point C to step 420 in FIG. 6. Further processing takes place according to flow diagram 400 in FIG. 6.

Figure 8:
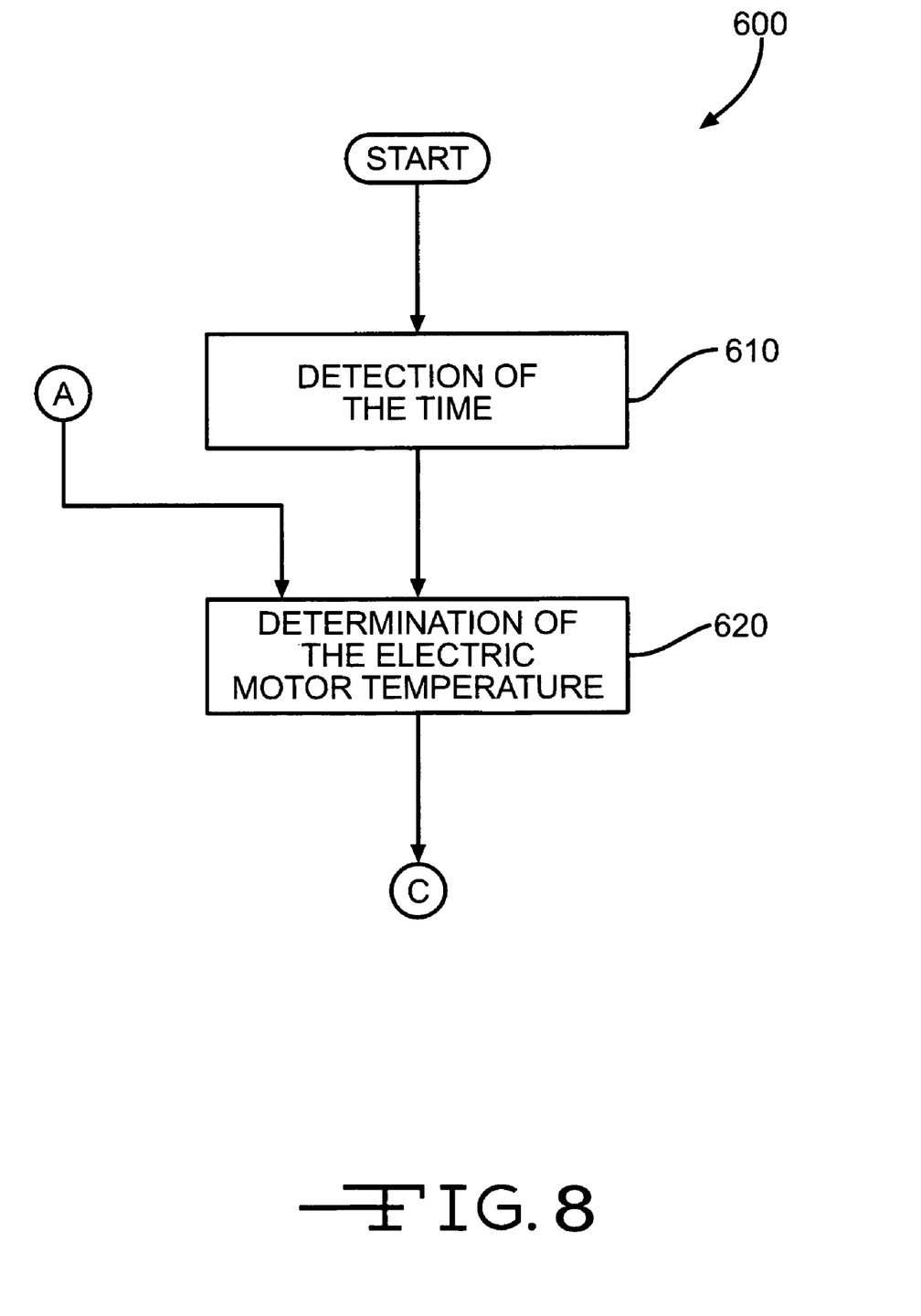

FIG. 8 shows a further embodiment of the method according to the invention for determining the temperature of the electric motor 20 in a flow diagram 600. Inherent heating of the electric motor 20 is indicated in this case with reference to the number n of actuations of the parking brake within a predetermined time segment (ΔT is typically 5° C. per actuation). For this purpose time information is also detected in the electronic control unit ECU in step 610. The brake actuations n are also counted by means of a counter. This information can be provided by the same actuation counter that was described in FIGS. 3 and 4, or can be read from the memory 50 for current values. These values can then be supplied via an intersecting point A to process step 620. The temperature is then calculated in process step 620. The temperature information is then supplied to step 410 in FIG. 6 by means of an intersecting point C. The processing thereinafter of the temperature information takes place according to flow diagram 400 in FIG. 4.

The person skilled in the art will obviously be encouraged by the above embodiments, given merely by way of example, to combine the individual control parameters of the method, such as temperature and resistance of the electric motor 20 and the actuation number n, with each other.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. Method for controlling a parking brake comprising the steps of:
   (a) providing a brake actuator that acts directly upon one or more brake shoes, the brake actuator including an electric motor that is operative to generate a brake application force; and
   (b) using current consumption of the electric motor as a measured quantity for adjusting the brake application force, and
   (c) adjusting a predetermined brake application force in correction with a compensation of a loss in braking effect such that changes in the predetermined brake application force are counteracted by varying the size of a cutoff current of the electric motor to maintain the same brake application force.

2. Method according to claim 1, wherein to determine changes in the application force, an event is counted and the cutoff current is varied as a function of an event number.

3. Method according to claim 2, wherein attainment of a predetermined event number is determined and further wherein on attainment of the event number a measure for changing the cutoff current of the electric motor is triggered.

4. Method according to claim 2, wherein the counted events include at least one of the actuation of the brake, stopping of the vehicle, locking of the vehicle and other events of this type.

5. Method according to claim 1, wherein a change in the resistance of the electric motor is taken into account when varying the cutoff current.

6. Method according to claim 5, wherein conclusions about the change in the resistance of the electric motor are drawn as a function of at least one of the temperature of the electric motor, the temperature of the brake disc, the number of actuations of the brake within a predetermined time interval, the idling speed of the electric motor and the operating voltage.

7. Method according to claim 1, wherein a change in an idling current of the electric motor is taken into account when varying the cutoff current.

8. Method according to claim 1, wherein the cutoff current of the electric motor is divided into an idling current component and a current consumption component for generating the brake application force and further wherein the idling current component is not taken into account in decisions relating to cutting off the current to the electric motor.

9. Method according to claim 1, wherein the cutoff current of the electric motor is varied as a function of variations in the operating voltage of an on-board electrical system.

10. Method according to claim 1, wherein the cutoff current is increased as one of gradually and continuously.

11. Method according to claim 1, wherein, if a parameter, which is predefined by a tolerance range and allows a conclusion to be drawn about changes in an idling current, upon a different value being measured, a diagnosis or warning signal is emitted.

12. Electronic unit for controlling a brake actuator, which acts on one or more brake shoes comprising:
   a brake actuator that is driven by an electric motor, the actuator acting directly upon one or more brake shoes and being operative to move the brake shoes to develop a brake application force; and
   an electronic control unit connected to the electric motor, the control unit constructed to use a current consumption of the electric motor as the measured quantity for adjusting the brake application force and to counteract changes in the brake application force owing to variation in a cutoff current of the electric motor for adjusting a predetermined brake application force in connection with the compensation of a loss in braking effect in order to maintain the same brake application force.

13. Control unit according to claim 12, wherein the electronic control unit is coupled to sensors for detecting at least one of temperature, time, electrical variables and the number of specific events, and further wherein the cutoff current is varied as a function of the output signals of at least one of the sensor.

14. Control unit according to claim 12, wherein the control unit comprises a first memory sector in which one of the current size and desired size of the cutoff current is stored.

15. Control unit according to claim 13, wherein the current sensor values are stored in one of a first memory sector and a second memory sector and predefined reference values of the parameters of the brake actuator are stored in a further memory sector.

16. Control unit according to claim 12 wherein the control unit is included in a parking brake.

* * * * *

UNITED STATES PATENT AND TRADEMARK OFFICE
CERTIFICATE OF CORRECTION

| | |
|---|---|
| PATENT NO. | : 7,227,324 B2 |
| APPLICATION NO. | : 11/471077 |
| DATED | : June 4, 2007 |
| INVENTOR(S) | : Ralf Erben et al. |

It is certified that error appears in the above-identified patent and that said Letters Patent is hereby corrected as shown below:

Column 10, Line 9, delete "sensor" and insert --sensor(s)--.

Signed and Sealed this

Thirty-first Day of July, 2007

JON W. DUDAS
*Director of the United States Patent and Trademark Office*

UNITED STATES PATENT AND TRADEMARK OFFICE
CERTIFICATE OF CORRECTION

PATENT NO.        : 7,227,324 B2
APPLICATION NO. : 11/471077
DATED             : June 5, 2007
INVENTOR(S)       : Ralf Erben et al.

It is certified that error appears in the above-identified patent and that said Letters Patent is hereby corrected as shown below:

Column 10, Line 9, delete "sensor" and insert --sensor(s)--.

This certificate supersedes Certificate of Correction issued July 31, 2007.

Signed and Sealed this

Twenty-first Day of August, 2007

JON W. DUDAS
*Director of the United States Patent and Trademark Office*